(No Model.)
J. E. JONES.
LAWN WEEDER.
No. 488,817. Patented Dec. 27, 1892.
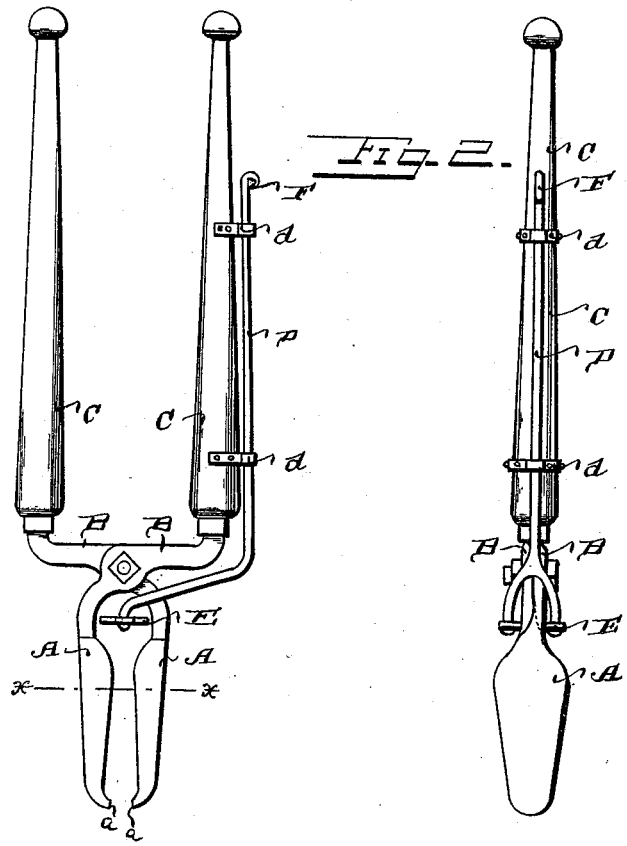
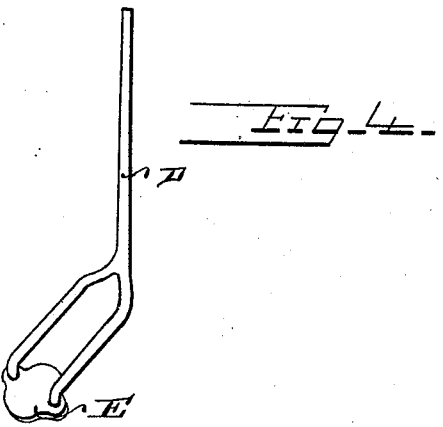
Witnesses:
Jesse Heller.
Phill O. Masi.
Inventor.
James E. Jones
by E. W. Anderson
his Attorney.
THE NORRIS PETERS CO., PHOTO-LITHO., WASHINGTON, D. C.

UNITED STATES PATENT OFFICE.

JAMES E. JONES, OF KANKAKEE, ILLINOIS.

LAWN-WEEDER.

SPECIFICATION forming part of Letters Patent No. 488,817, dated December 27, 1892.

Application filed August 20, 1892. Serial No. 443,690. (No model.)

*To all whom it may concern:*

Be it known that I, JAMES E. JONES, a citizen of the United States, and a resident of Kankakee, in the county of Kankakee and State of Illinois, have invented certain new and useful Improvements in Lawn-Weeders; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a front elevation of the weeder. Fig. 2 is a side view. Fig. 3 is a detail view in section of the cutting blades and Fig. 4 is a detail view of the cleaning attachment.

This invention relates to certain new and useful improvements in lawn weeders, the object being to provide a simple and efficient device of this character, whereby the operator can stand up to his work, cut the root of the weed at a considerable distance below the surface, and remove it from the ground; and further, to provide the device with a cleaning attachment by means of which the weed may be discharged into a suitable receptacle for the purpose, and the cutting blades kept free from dirt and obstructions.

With these objects in view, the invention consists in the novel construction and combination of parts, all as hereinafter specified, and set forth in the accompanying claim.

Referring to the accompanying drawings illustrating the invention, the letters A, A, designate two steel blades with cutting edges of concave form on their inner faces, and working in close relation to each other. Said blades at their lower portions terminate in cutting points or nippers *a, a*, which meet each other when closed. At their upper portions the blades are pivoted together in the same manner as a pair of shears, the tangs or shanks B, B, running in opposite directions at substantially right angles to the blades, and turning upwardly to receive the handle bars C, C. The horizontal portions of the tangs or shanks form a ledge or seat to enable the foot of the operator to press the blades firmly into the ground. The handle bars should be sufficiently long to prevent any necessity on the part of the operator to bend or stoop in using the device, and to give him sufficient leverage to cut the root.

D designates the discharge or cleaning attachment, which consists of a rod or bar running down one of the handles in suitable guides *d*, and connected at the bottom with a small disk E, arranged to play up and down between the blades to eject the weed when pulled, and to clean away the adhering soil. On the upper extremity of the rod is a loop or ring F, to receive the finger of the operator.

In operation, the device is placed over the weed to be removed, and the blades are pressed by the foot into the ground on each side of the root. The handles are then brought toward each other, which cuts the root, and the weed is brought up with the blades. The cleaning attachment is then operated to eject the root into a suitable receptacle for the purpose, and to clean the blades.

Having described this invention, what I claim and desire to secure by Letters Patent is:

The herein described weeding implement, comprising the steel blades A, A, having cutting edges, and concaved on their meeting faces, said blades terminating at their lower ends in inwardly-turned points or nippers, and at their upper ends having tangs or shanks pivoted one to the other, said tangs or shanks above said pivot running horizontally and laterally, and having their ends turned upwardly to receive the parallel handles C, C, and the cleaner comprising the rod or bar running along one of said handles in guides, and carrying at its lower end a disk E, arranged to play up and down between the concave faces of said blades, substantially as specified.

In testimony whereof I affix my signature in presence of two witnesses.

JAMES E. JONES.

Witnesses:
J. E. SMITH,
H. M. STONE.